(12) United States Patent
Walawender et al.

(10) Patent No.: US 10,434,857 B2
(45) Date of Patent: *Oct. 8, 2019

(54) VEHICLE WINDOW WEATHERSTRIPPING HAVING AN INNER BELT WITH INTERLOCKING END DETAILS

(71) Applicant: Ford Global Technologies, LLC, Dearborn, MI (US)

(72) Inventors: Chester Stanislaus Walawender, Livonia, MI (US); Nizam Khan, Brownstown, MI (US); Sheri Reck, Ann Arbor, MI (US); Gabriel Blanco, West Bloomfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

This patent is subject to a terminal disclaimer.

(21) Appl. No.: 15/241,135

(22) Filed: Aug. 19, 2016

(65) Prior Publication Data

US 2018/0050582 A1 Feb. 22, 2018

(51) Int. Cl.
| | | |
|---|---|---|
| *B60J 10/76* | (2016.01) | |
| *B60J 10/74* | (2016.01) | |
| *B60J 10/78* | (2016.01) | |
| *B60J 10/84* | (2016.01) | |
| *B60J 5/04* | (2006.01) | |
| *B60J 10/75* | (2016.01) | |

(52) U.S. Cl.
CPC ............. *B60J 10/76* (2016.02); *B60J 5/0402* (2013.01); *B60J 5/0409* (2013.01); *B60J 5/0411* (2013.01); *B60J 10/74* (2016.02); *B60J 10/75* (2016.02); *B60J 10/78* (2016.02); *B60J 10/84* (2016.02)

(58) Field of Classification Search
None
See application file for complete search history.

(56) References Cited

U.S. PATENT DOCUMENTS

| | | | | |
|---|---|---|---|---|
| 3,742,649 A | * | 7/1973 | Dochnahl | B60J 10/265 49/441 |
| 4,894,954 A | * | 1/1990 | Nozaki | B60J 10/235 49/373 |
| 5,054,240 A | * | 10/1991 | Nakahara | B60J 10/85 49/479.1 |
| 6,502,832 B2 | * | 1/2003 | Goto | F16J 15/025 277/642 |

(Continued)

FOREIGN PATENT DOCUMENTS

CN 103625258 3/2014

*Primary Examiner* — Marcus Menezes
(74) *Attorney, Agent, or Firm* — Vichit Chea; Price Heneveld LLP

(57) ABSTRACT

A vehicle sealing assembly includes a vehicle frame defining a frame cavity. A vehicle door has a door trim panel and an inner frame panel that define a door cavity in communication with the frame cavity. An operable window is disposed proximate the door cavity and is operable between open and closed positions. A beltline seal is disposed between the door trim and inner frame panels and in engagement with the operable window in the closed position. A front beltline end piece is integrally formed between a front vertical support of the window and a front end of the beltline seal.

9 Claims, 7 Drawing Sheets

(56) References Cited

U.S. PATENT DOCUMENTS

| | | | |
|---|---|---|---|
| 6,536,161 B2* | 3/2003 | Saito | B60J 5/0477 |
| | | | 49/368 |
| 6,837,005 B2 | 1/2005 | Arata et al. | |
| 8,001,727 B2* | 8/2011 | Ho | B29C 45/14467 |
| | | | 49/374 |
| 8,181,397 B2 | 5/2012 | Daio et al. | |
| 8,506,143 B2* | 8/2013 | Sugiura | B60J 5/0411 |
| | | | 362/501 |
| 8,572,897 B2* | 11/2013 | Dishman | B60J 10/21 |
| | | | 49/377 |
| 9,283,835 B2* | 3/2016 | Dosaki | B60J 10/20 |
| 9,937,778 B2* | 4/2018 | Walawender | B60J 10/74 |
| 2017/0057334 A1* | 3/2017 | Toyota | B60J 5/0418 |
| 2017/0225552 A1* | 8/2017 | Masumoto | B60J 10/22 |
| 2017/0225553 A1* | 8/2017 | Masumoto | B60J 10/76 |
| 2017/0274748 A1* | 9/2017 | Masumoto | B60J 10/18 |

* cited by examiner

US 10,434,857 B2

VEHICLE WINDOW WEATHERSTRIPPING HAVING AN INNER BELT WITH INTERLOCKING END DETAILS

FIELD OF THE INVENTION

The present invention generally relates to a window seal system, more specifically, a window seal system that limits air leaks from entering the passenger cabin from areas around the vehicle frame.

BACKGROUND OF THE INVENTION

The vehicle frame includes multiple components that define various framed cavities within which components of the vehicle are located. Many of these cavities of the vehicle frame are interconnected, such that air flow from one space can move to another. Such spaces of the vehicle frame can also be located within vehicle doors and near operable windows.

SUMMARY OF THE INVENTION

According to one aspect of the present invention, a vehicle sealing assembly includes a vehicle frame defining a frame cavity. A vehicle door has a door trim panel and an inner frame panel that define a door cavity in communication with the frame cavity. An operable window is disposed proximate the door cavity and is operable between open and closed positions. A beltline seal is disposed between the door trim and inner frame panels and is in engagement with the operable window in the closed position. A front beltline end piece is integrally formed between a front vertical support of the window and a front end of the beltline seal.

According to another aspect of the present invention, a beltline seal is disposed in selective engagement with a window operable in a cavity defined between door trim and inner frame panels, the beltline seal extending between the window and the door trim panel to divert a flow of air from the door cavity. A front beltline end piece is formed to the front vertical support of the window.

According to another aspect of the present invention, a vehicle door sealing assembly includes a beltline seal positioned between a door trim panel and an inner frame panel that define a door cavity of a vehicle door. A window is disposed proximate the beltline seal. Front and rear beltline end pieces extend from the beltline seal to front and rear vertical supports of the window, respectively.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
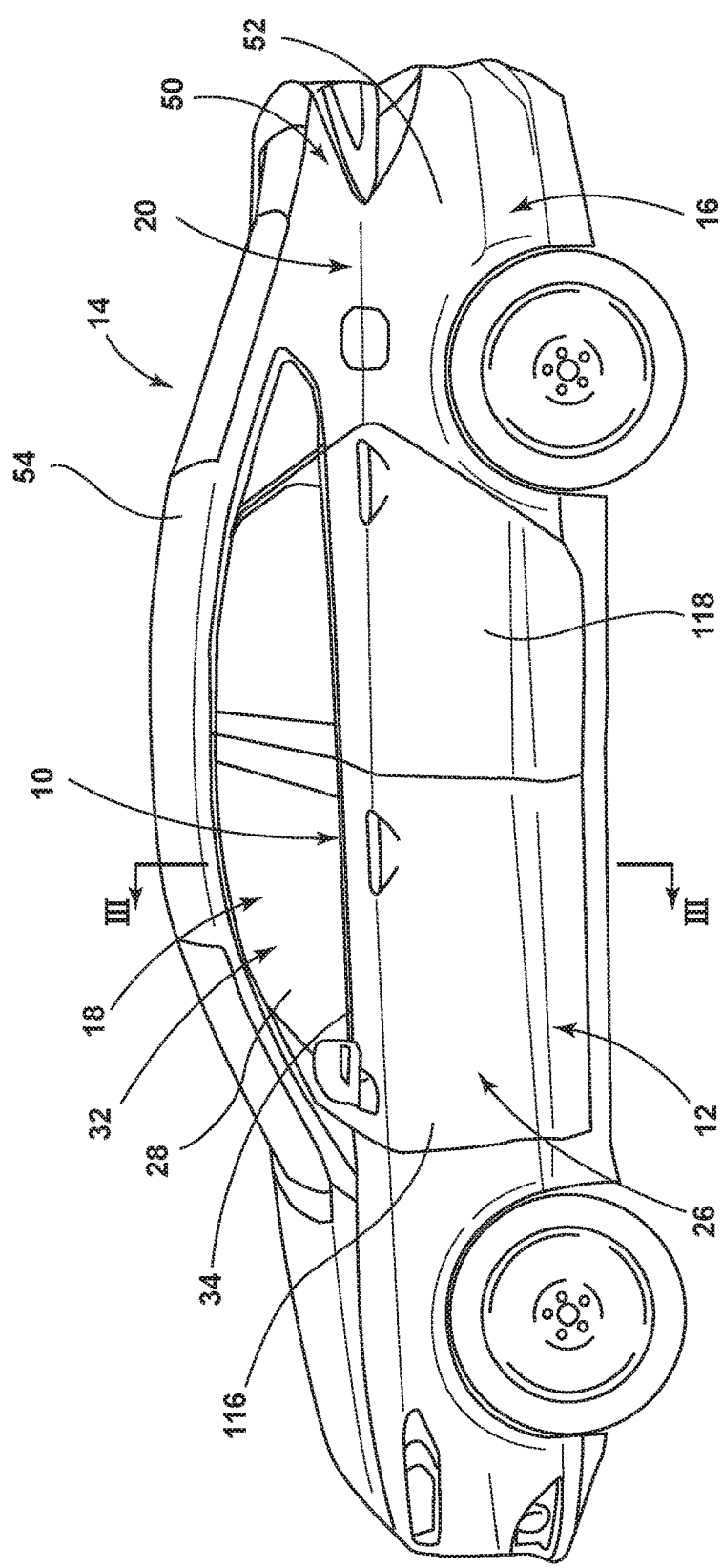
FIG. 1 is a side perspective view of a vehicle incorporating an aspect of a beltline seal for a vehicle window having interlocking end details.
Figure 2:
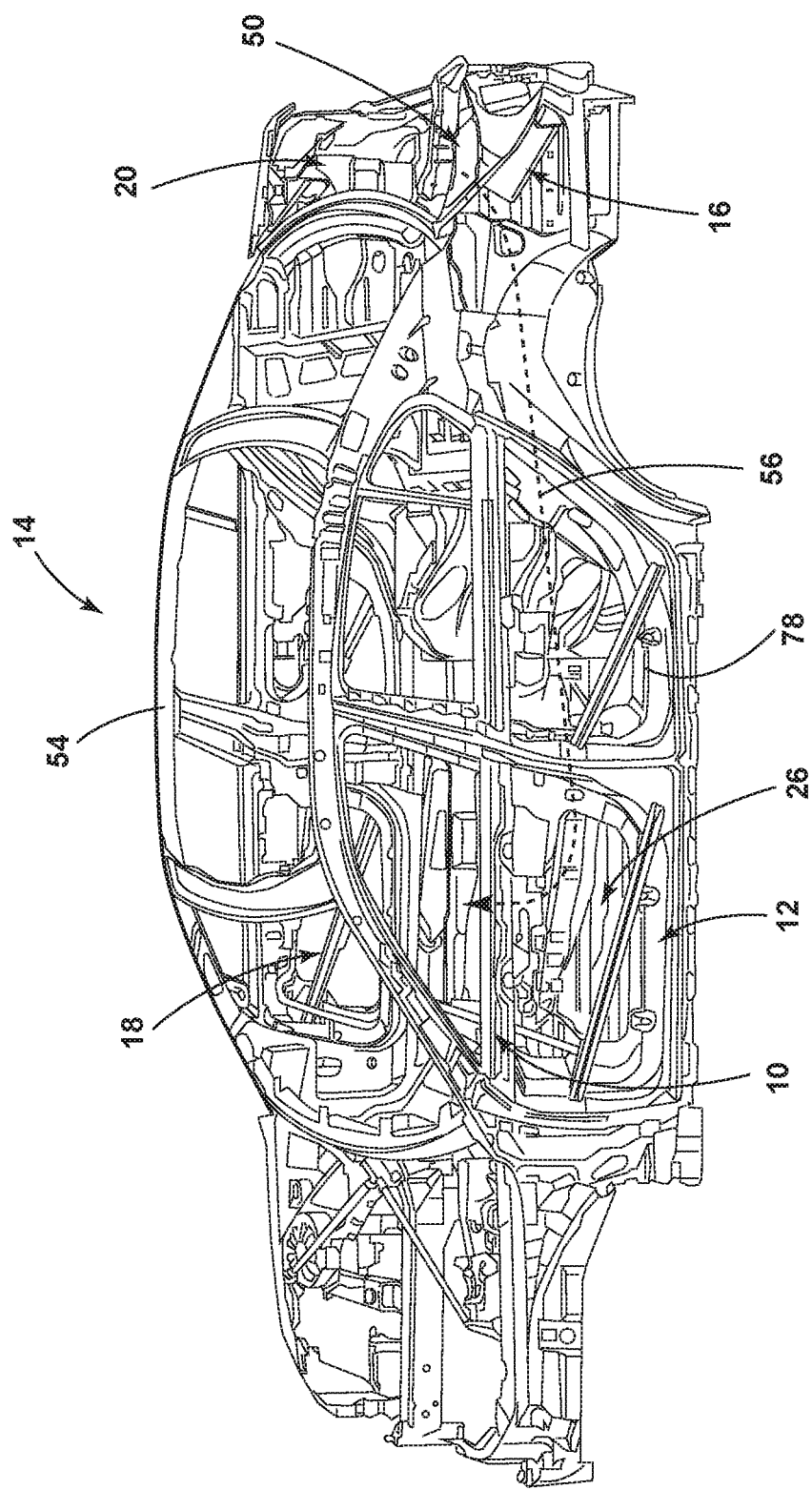
FIG. 2 is a side perspective view of a vehicle frame of the vehicle of FIG. 1 with the outer body panels removed.
Figure 3:
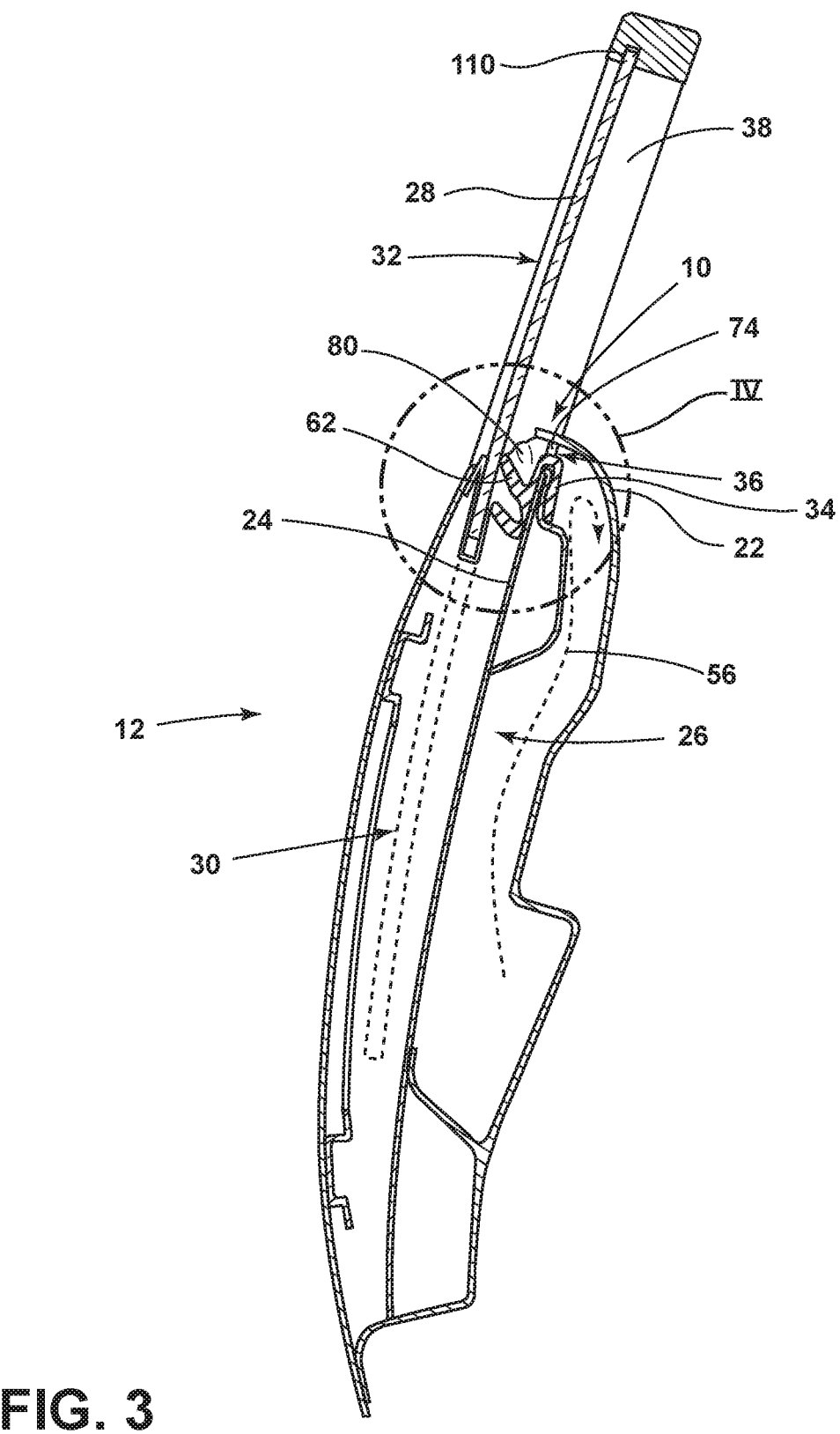
FIG. 3 is a cross-sectional view of the vehicle door of FIG. 1 taken along line III-III.
Figure 4:
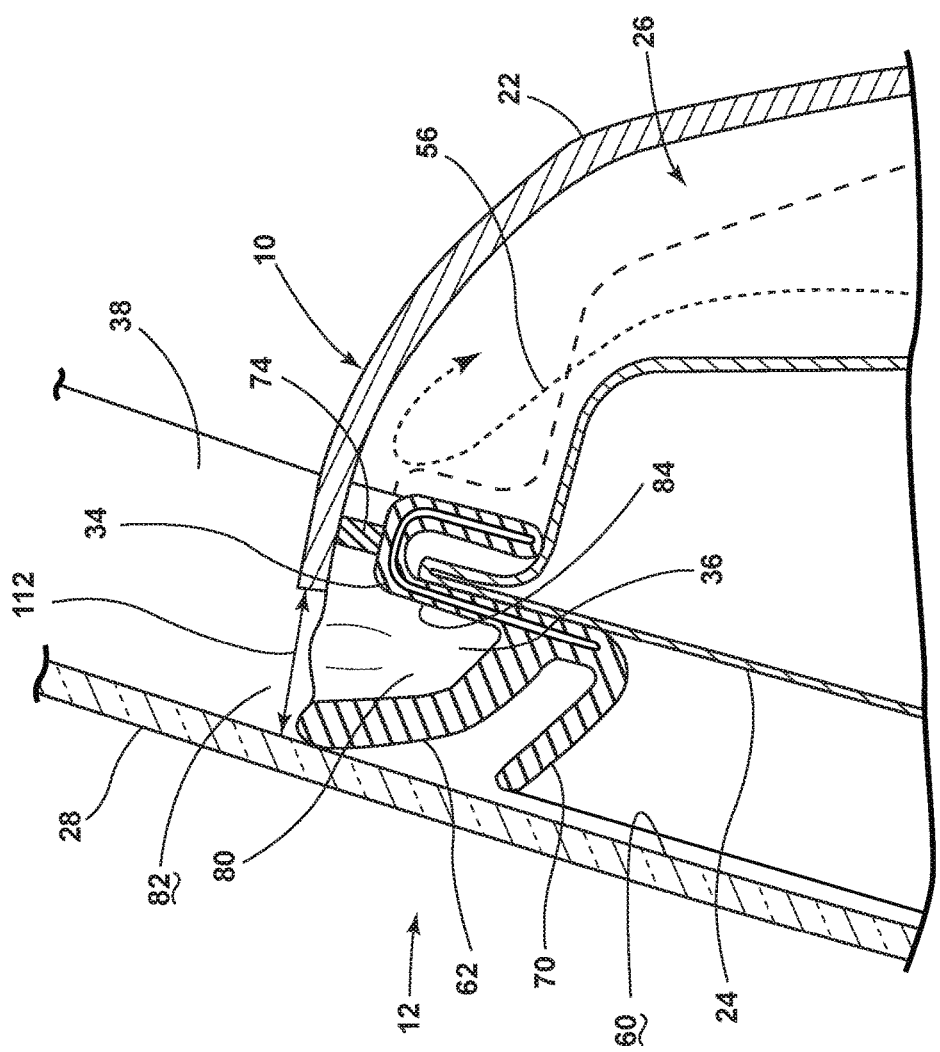
FIG. 4 is an enlarged cross-sectional view of the vehicle door of FIG. 3 taken at area IV.
Figure 5:
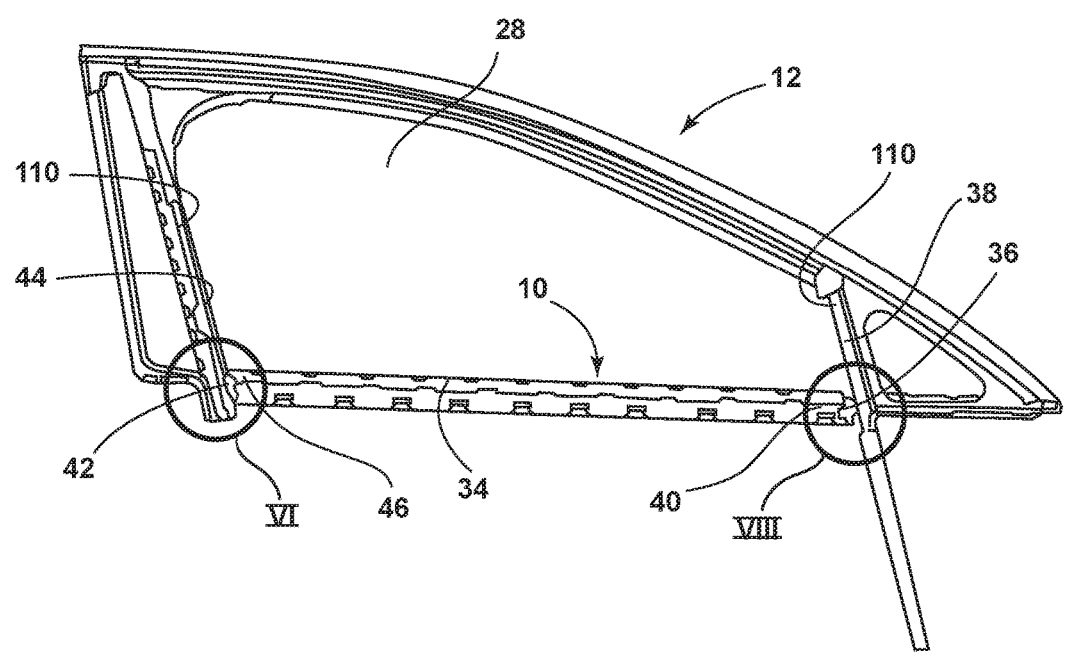
FIG. 5 is a partial elevational view of a vehicle door showing the weatherstrip assembly extending around the frame of the window of the vehicle door.
Figure 6:
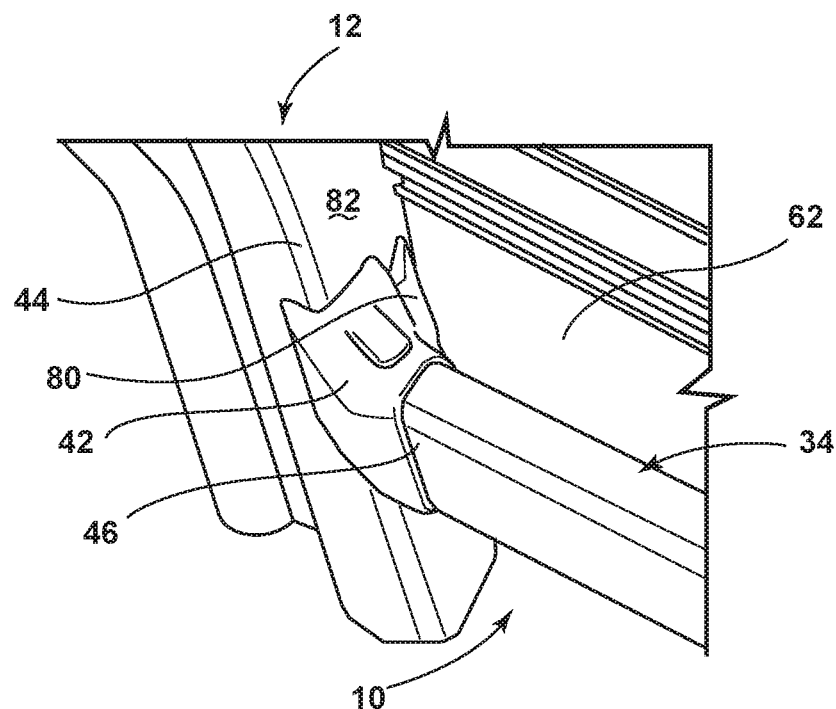
FIG. 6 is a detail perspective view of the rear beltline end piece of the beltline seal for the vehicle door.
Figure 7:
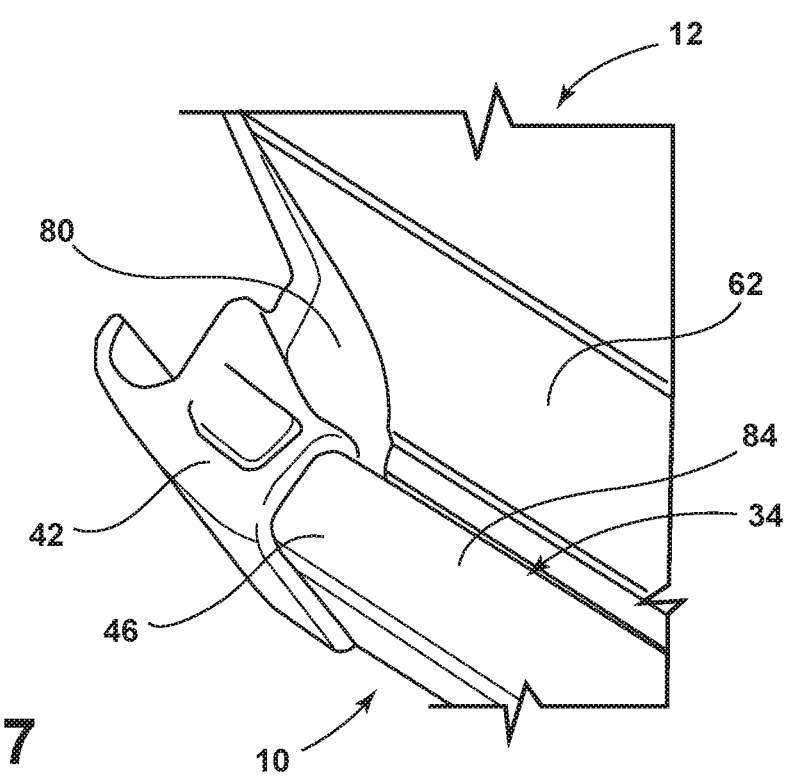
FIG. 7 is a perspective view of the rear beltline end piece of FIG. 6 with the rear vertical support removed.
Figure 8:
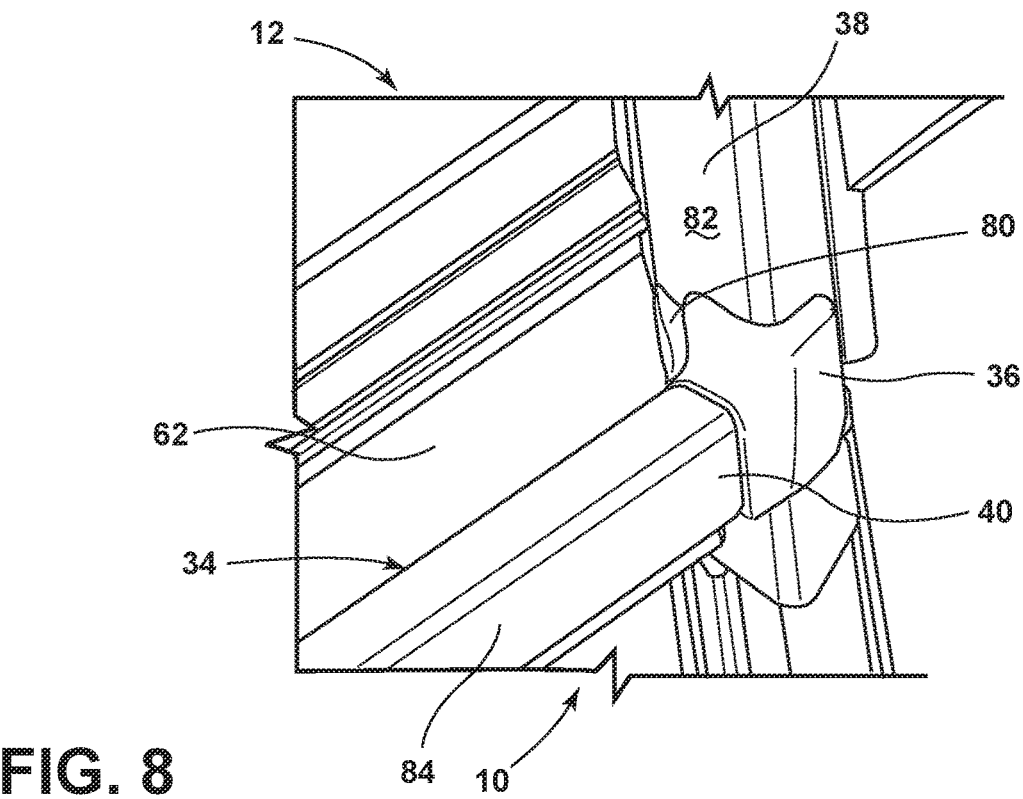
FIG. 8 is a detail perspective view of the front beltline end piece of the beltline seal for the vehicle door.
Figure 9:
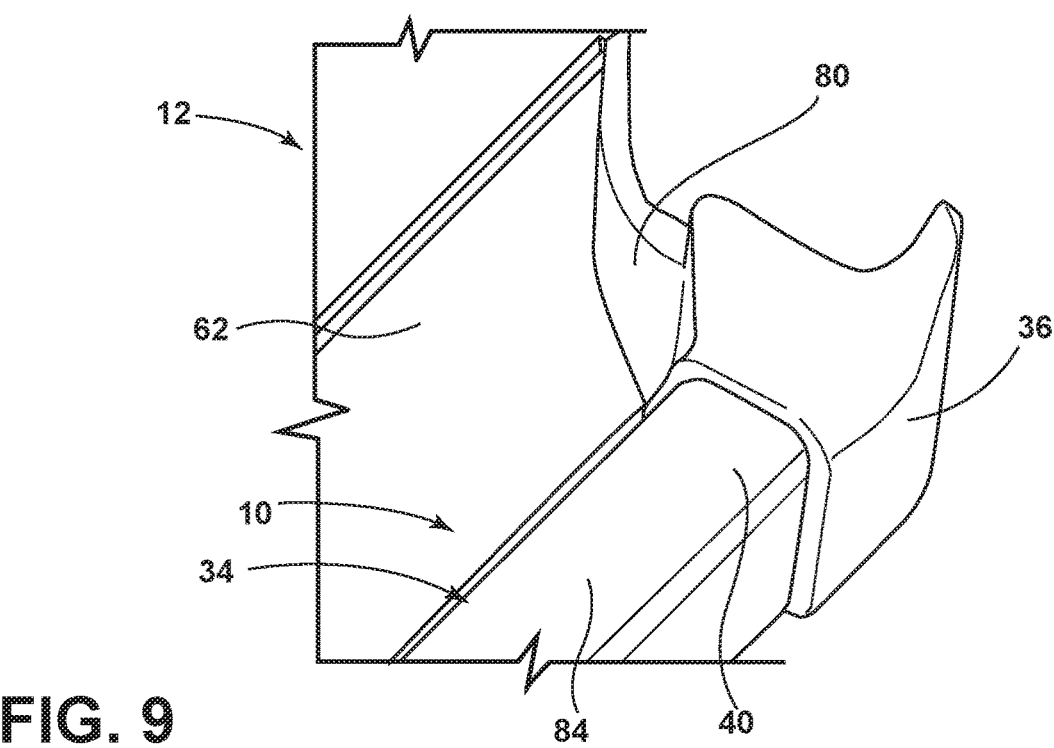
FIG. 9 is a detail perspective view of the front beltline end piece of FIG. 8 with the front vertical support for the vehicle door removed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a sealing assembly for a door 12 of a vehicle 14 that is positioned between a frame 16 of the vehicle 14 and a passenger cabin 18 of the vehicle 14. The sealing assembly 10 for the vehicle 14 includes a vehicle frame 16 that defines a frame cavity 20 and a door 12 of the vehicle 14 having a door trim panel 22 and an inner frame panel 24 defining a door cavity 26 in communication with the frame cavity 20. An operable window 28 is disposed proximate the door cavity 26 and is operable between open and closed positions 30, 32. A beltline seal 34 is disposed between the door trim panel 22 and inner frame panel 24 and is in engagement with the operable window 28 at least in the closed position 32. A front beltline end piece 36 is integrally formed between a front vertical support 38 of the operable window 28 and a front end 40 of the beltline seal 34. According to various embodiments, a rear beltline end piece 42 can be integrally formed between a rear vertical support 44 of the window 28 and a rear end 46 of the beltline seal 34.

Referring again to FIGS. 1-6, the door cavity 26 defines a space that is in communication with the frame cavity 20 of the frame 16 of the vehicle 14. The frame cavity 20 can include various portions distal from the door 12 such as areas proximate the trunk 50, quarter panels 52, roof 54, floor and other areas of the frame 16 of the vehicle 14. A flow of air 56 can extend from one portion of the frame cavity 20 to another portion of the frame cavity 20 including, but not limited to, the door cavity 26 defined between the door trim panel 22 and the inner frame panel 24. This flow of air 56 can carry various odors from portions of the vehicle 14 through the frame cavity 20 and into the door cavity 26. Such odors can originate from the spare tire proximate the trunk 50, mechanical portions of the vehicle 14, various seals, and other non-exhaust type odors that, while not necessarily hazardous to the user, may be unpleasant and detract from the driving experience of the user. Additionally, various sounds emanating from the vehicle 14 can travel through the frame cavity 20 and the door cavity 26. Such sounds can include, but are not limited to, engine noises, noises from the wheels and/or suspension, and other noises from various mechanical and electrical systems positioned throughout the vehicle 14 and typically within the frame cavity 20 or the door cavity 26 of the vehicle 14.

According to the various embodiments, and in order to mitigate the various odors and noises that may travel through the frame cavity 20 and/or door cavity 26, the beltline seal 34 is positioned proximate the window 28 for the door 12 of the vehicle 14 to seal off the door cavity 26 from the passenger cabin 18. A substantially tight and continuous seal to block the passage of air 56 and the transfer of noise from the door cavity 26 to the passenger cabin 18 can be useful in maximizing the driving experience or the experience of the various passengers within the passenger cabin 18 of the vehicle 14.

Referring again to FIGS. 3-9, the front and rear beltline end pieces 36, 42 that are integrally formed with the beltline seal 34 serve to create a substantially continuous sealing surface that engages an interior surface 60 of the window 28 of the door 12. The substantially continuous seal generated by the beltline seal 34 can enable a robust seal of from approximately 1 pound per square inch to approximately 3 pounds per square inch of sealing pressure to prevent leak paths between the door cavity 26 and the passenger cabin 18. Additionally, the front and rear beltline end pieces 36, 42 can be integrally formed with an upper lip 62 of the beltline seal 34 to form the substantially continuous sealing engagement to prevent leak paths at the front and rear ends 40, 46 of the beltline seal 34. This sealing assembly 10 created by the beltline seal 34 and the front and rear beltline end pieces 36, 42 can create a performance of essentially zero liters per second of leakage of air 56 from the door cavity 26 into the passenger cabin 18.

Referring again to FIGS. 3-9, it is also contemplated that the front and rear beltline end pieces 36, 42 can be integrally formed with the lower lip 70 of the beltline seal 34. In such an embodiment, the upper lip 62 of the beltline seal 34 may be able to individually and separately flex or otherwise deflect separate from the front and rear beltline end pieces 36, 42 during operation of the window 28 for vehicle door 12 between the open and closed positions 30, 32.

Referring again to FIGS. 2-9, the front and rear beltline end pieces 36, 42 can each define a flexible web member 80 that extends from an upper lip 62 of the beltline seal 34 to an exterior surface 82 of the front and rear vertical supports 38, 44, respectively. Additionally, the front and rear beltline end pieces 36, 42 extend around at least a portion of the exterior surfaces 82 of the front and rear vertical supports 38, 44 of the window 28, respectively, in order to generate the robust seal between the door cavity 26 and the passenger cabin 18. By way of example, the front and rear beltline end pieces 36, 42 can extend around three or more sides of the front and rear vertical supports 38, 44. Accordingly, the front and rear beltline end pieces 36, 42 substantially surrounds a portion of the front and rear vertical supports 38, 44, respectively. To generate the integral nature of the front and rear beltline end pieces 36, 42 with the beltline seal 34 and/or the front and rear vertical supports 38, 44, the front and rear beltline end pieces 36, 42 can be integrally injection molded to either the upper lip 62, the lower lip 70, or both the upper and lower lips 62, 70 of the beltline seal 34 and also to a portion of the main body 84 of the beltline seal 34. The integrally formed and flexible web member 80 that extends from the upper and/or lower lip 62, 70 of the beltline seal 34 to the front and rear vertical supports 38, 44, respectively, maintains the sealing engagement between the beltline seal 34 and the window 28 during operation of the window 28. Accordingly, the use of the front and rear beltline end pieces 36, 42 allows the upper and lower lips 62, 70 of the beltline seal 34 to flex without separating the beltline seal 34 from the front and rear vertical supports 38, 44 of the vehicle door 12.

By not separating during operation of the window 28 of the vehicle door 12, the front and rear beltline end pieces 36, 42 maintain engagement with the front and rear vertical supports 38, 44 to prevent, or substantially prevent, the formation of a leak path of air 56 from the door cavity 26 to the passenger cabin 18. As discussed above, the front and rear beltline end pieces 36, 42 and the beltline seal 34 cooperate to define a sealing strength of approximately one pound per square inch to approximately 3 pounds per square inch at the engagement between the beltline seal 34, the front and rear vertical supports 38, 44, and the window 28 of the vehicle door 12.

Referring again to FIGS. 3-9, the front and rear beltline end pieces 36, 42 can be injection molded along with the remainder of the beltline seal 34 to form a single integral piece that can be installed as a single part on the door 12 of the vehicle 14. This single part can define a surface engagement or can be adhered to the front and rear vertical supports 38, 44 of the vehicle door 12 to secure the beltline seal 34 to the door 12. This engagement can be accomplished through various methods that can include, but are not limited to, surface-to-surface engagement, welding, gluing, fastening, combinations thereof, and other similar attachment mechanisms and methods. In order to create a substantially continuous seal between the front and rear beltline end pieces 36, 42 and the front and rear vertical supports 38, 44, respectively, the front and rear beltline end pieces 36, 42 can be injection molded around the front and rear vertical supports 38, 44. The front and rear beltline end pieces 36, 42 can also be injection molded around forms that have a shape that substantially conforms to that of the respective exterior surfaces 82 of the front and rear vertical supports 38, 44. Where these forms are used, the shape of the front and rear beltline end pieces 36, 42 matches, or substantially matches, that of the front and rear vertical supports 38, 44 when installed in the vehicle 14 to define the substantially continuous engagement between the front and rear beltline end pieces 36, 42 and the front and rear vertical supports 38, 44 of the vehicle door 12.

Referring again to FIGS. 3-9, the front and rear beltline end pieces 36, 42 can be injection molded as a continuous piece with the remainder of the beltline seal 34 or can be injection molded around the front and rear ends 40, 46 of the beltline seal 34 in a separate injection molding process. As discussed above, the separate injection molding process can be performed before the beltline seal 34 is installed in the vehicle 14, or can be installed when the beltline seal 34 is installed against a portion of the vehicle door 12 such that the injection molding of the front and rear beltline end pieces 36, 42 can be molded around portions of the beltline seal 34 as well as portions of the front and rear vertical supports 38, 44 of the vehicle door 12 in a single injection molding operation. Typically, the front and rear beltline end pieces 36, 42 will be injection molded with at least a portion of the beltline seal 34 and installed to the front and rear vertical supports 38, 44 of the vehicle door 12 subsequently.

Referring again to FIGS. 1-9, the sealing assembly 10 for the vehicle door 12 can include the beltline seal 34 that is disposed in selective engagement with the window 28 operable within the door cavity 26 between the door trim panel 22 and the inner frame panel 24. The beltline seal 34 can define a leak seal 74 at the door trim panel 22 to divert a flow of air 56 from the door cavity 26 and into the passenger cabin 18. A front beltline end piece 36 is formed to the front vertical support 36 of the window 28 at a front end 40 of the beltline seal 34. Additionally, a rear beltline end piece 42 can be formed to the rear vertical support 44 of the window 28. According to the various embodiments, the front and rear beltline end pieces 36, 42 can be formed as an integral portion of the beltline seal 34 or can be a separately injection molded component of the beltline seal 34. The front and rear beltline end pieces 36, 42 serve to define a flexible web member 80 that extends between a body 84 of the beltline seal 34 and an upper lip 62 of the beltline seal 34. This flexible web member 80 can also extend between the upper lip 62 of the beltline seal 34 and the front and rear vertical supports 38, 44 of the vehicle door 12, respectively.

Referring again to FIGS. 3-9, the front and rear beltline end pieces 36, 42 can be injection molded to exterior surfaces 82 of the front and rear supports, respectively. Instead of injection molding to the exterior surfaces 82 of the front and rear vertical supports 38, 44, the front and rear beltline end pieces 36, 42 can be injection molded within a form that substantially matches the shape of the exterior surfaces 82 of the front and rear vertical supports 38, 44, respectively. The front and rear beltline end pieces 36, 42 of the beltline seal 34 can then be coupled to front and rear vertical supports 38, 44. Because the front and rear beltline end pieces 36, 42 have been shaped to match the outer surfaces of the front and rear vertical supports 38, 44, respectively, the mere engagement of the front and rear beltline end pieces 36, 42 with the front and rear vertical supports 38, 44 can create a substantially continuous engagement between the front and rear beltline end pieces 36, 42 and the front and rear vertical supports 38, 44, respectively. This surface-to-surface engagement between the front and rear beltline end pieces 36, 42 and the front and rear vertical supports 38, 44 through use of the flexible web member 80 allows for the robust seal of 1 pound per square inch to separate the door cavity 26 from the passenger cabin 18. This seal strength, in certain embodiments, may exceed 1 pound per square inch and may be as much as 3 pounds per square inch to define a threshold pressure at which the beltline seal 34 and the front and rear beltline end pieces 36, 42 maintain contact with the respective portions of the vehicle door 12.

According to the various embodiments, the flexible web members 80 defined by the front and rear beltline seals 34 can have an elastic character such that portions of the front and rear beltline end pieces 36, 42 may separate from the front and rear vertical supports 38, 44 where the internal pressure within the door cavity 26 exceeds the threshold pressure of the seal defined between the front and rear beltline end pieces 36, 42 and the front and rear vertical supports 38, 44, respectively. The internal pressure within the door cavity 26 may exceed this threshold pressure and certain events that can include, but are not limited to, collisions or impacts involving the vehicle 14 or other similar event that may increase the pressure within the door cavity 26. In such an event, and in order to relieve the internal pressure of the door cavity 26, the front and rear beltline end pieces 36, 42 may separate from the front and rear vertical supports 38, 44 and/or the interior surface 60 of the window 28 to allow this excess pressure to escape the door cavity 26. Where the front and rear beltline seals 34 are adhered or welded to the front and rear vertical supports 38, 44, other portions of the beltline seal 34 distal from the front and rear beltline end pieces 36, 42 may be adapted to separate from the window 28 in order to allow this release of excessive pressure within the door cavity 26.

Referring again to FIGS. 1-9, the sealing assembly 10 for the door 12 of the vehicle 14 can include the beltline seal 34 that is positioned between the door trim panel 22 and the inner frame panel 24 to define a door cavity 26 of the door 12 of the vehicle 14. The window 28 can be positioned proximate the beltline seal 34 and front and rear beltline end pieces 36, 42 can extend from the beltline seal 34 to front and rear vertical supports 38, 44 of the window 28, respectively. The front and rear vertical supports 38, 44 of the vehicle door 12 can define window guides 110 that assist in the movement of the window 28 between the open and closed positions 30, 32 and substantially prevent the inward and/or outward movement of the window 28 during operation of the window 28 between the open and closed positions 30, 32. It is contemplated that the use of the beltline seal 34 and the front and rear beltline end pieces 36, 42 can allow for a substantially minimal clearance 112 between the window 28 and the door trim panel 22. Such a clearance 112 can be a distance along the lines of approximately 5 millimeters. This clearance 112 can also be a distance no greater than 5 millimeters and may be less than 5 millimeters in certain vehicle designs where the beltline seal 34 and the front and rear beltline end pieces 36, 42 allow for very minimal dimensional tolerances between the window 28 and the door trim panel 22 of the vehicle door 12.

Referring again to FIGS. 3-9, the beltline seal 34 is adapted to extend between the front and rear vertical supports 38, 44, where the front and rear beltline end pieces 36, 42 are formed to an exterior surface 82 of the front and rear vertical supports 38, 44, respectively. The operation to form the front and rear beltline end pieces 36, 42 to the outer surface of the front and rear vertical supports 38, 44 can include injection molding the front and rear beltline end pieces 36, 42 to a form that substantially matches the shape of the exterior surface 82 of the front and rear vertical supports 38, 44. This forming operation can also be a direct injection molding operation to injection mold the front and rear beltline end pieces 36, 42 to a portion of the beltline seal 34 and also to and around portions of the front and rear vertical supports 38, 44.

Additionally, the front and rear beltline end pieces 36, 42 can each include a flexible web member 80 that extends from a portion of the beltline seal 34 to a body 84 of the beltline seal 34 as well as the exterior surface 82 of the front and rear vertical supports 38, 44, respectively. The flexible web member 80 of the front and rear beltline end pieces 36, 42 can extend from the body 84 of the beltline seal 34 to the upper lip 62 of the beltline seal 34, the lower lip 70 of the beltline seal 34, or both the upper and lower lips 62, 70 of the beltline seal 34. It is also contemplated that the beltline seal 34 and the front and rear beltline end pieces 36, 42 can be formed of a single integral piece that extends between the front and rear vertical supports 38, 44. According to various embodiments, the engagement of the front and rear beltline end pieces 36, 42 with the front and rear vertical supports 38, 44, respectively, can define a substantially air-tight seal. This air-tight seal can, as discussed above, include a sealing strength of from approximately 1 pound per square inch up to approximately 3 pounds per square inch. This seal can be formed of a surface-to-surface engagement of the front and rear beltline end pieces 36, 42 with the exterior surface 82 of the front and rear vertical supports 38, 44. This sealing strength can also be formed through an attachment of the front and rear beltline end pieces 36, 42 with the front and rear vertical supports 38, 44, respectively.

According to the various embodiments, the beltline seal 34 having the front and rear beltline end pieces 36, 42 can be incorporated within various operable windows 28 within the vehicle 14. Such windows 28 can include, but are not limited to, windows 28 within the front doors 116, windows 28 within the rear doors 118, operable windows 28 within a tailgate of the vehicle 14, windows 28 within a moon roof 54 of the vehicle 14, combinations thereof, and other similar positions of a beltline seal 34 of a vehicle 14 for providing a sealing assembly 10 of an operable window 28 within the vehicle 14.

According to the various embodiments, the beltline seal 34 and/or the front and rear beltline end pieces 36, 42 can be made from various materials that can include, but are not limited to, rubber, polymers, composite materials, plastics, combinations thereof, and other similar materials that can provide for the sealing engagement between the beltline seal 34 and the front and rear vertical supports 38, 44 of the door 12 for the vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle sealing assembly comprising:
a vehicle frame defining a frame cavity;
a vehicle door having a door trim panel and an inner frame panel that define a door cavity in communication with the frame cavity;
an operable window disposed proximate the door cavity and operable between open and closed positions;
a beltline seal disposed between the door trim and inner frame panels and in engagement with the operable window in the closed position, wherein a separate leak seal extends between the beltline seal and the door trim panel, wherein the door trim panel is free of direct engagement with the beltline seal; and
a front beltline end piece integrally formed to the beltline seal and extending between a front vertical support of the operable window and a front end of the beltline seal, wherein the front beltline end piece includes a surface profile that is formed to match a corresponding profile surface of the front vertical support when the front beltline end piece is engaged with the front vertical support and when the front beltline end piece is separated from the front vertical support, and wherein the surface profile and the corresponding profile surface are engaged to define a continuous surface-to-surface engagement between the front beltline end piece and the front vertical support that further defines a sealing strength of one pound per square inch proximate the beltline seal, wherein the surface-to-surface engagement is separable under pressure in a range of from approximately one pound per square inch to approximately three pounds per square inch proximate the beltline seal, and wherein at least a portion of the beltline seal and the front beltline end piece are formed of the same material.

2. The vehicle sealing assembly of claim 1, further comprising:
a rear beltline end piece integrally formed to the beltline seal and extending between a rear vertical support of the operable window and a rear end of the beltline seal.

3. The vehicle sealing assembly of claim 2, wherein the front and rear beltline end pieces are integrally formed with an upper lip of the beltline seal.

4. The vehicle sealing assembly of claim 2, wherein the front and rear beltline end pieces each include a flexible web member that extends from an upper lip of the beltline seal to an exterior surface of the front and rear vertical supports, respectively.

5. The vehicle sealing assembly of claim 2, wherein the front and rear beltline end pieces are integrally injection molded to at least one of an upper lip and a lower lip of the beltline seal with a portion of the beltline seal.

6. The vehicle sealing assembly of claim 2, wherein the front and rear beltline end pieces are adhered to the front and rear vertical supports, respectively.

7. A vehicle door sealing assembly comprising:
a beltline seal positioned between a door trim panel and an inner frame panel that define a door cavity of a vehicle door;
a separate leak seal separating the beltline seal from direct contact with the door trim panel;
a window disposed proximate the beltline seal; and
front and rear beltline end pieces extending from the beltline seal to front and rear vertical supports of the window, respectively, wherein the front and rear beltline end pieces and a portion of the beltline seal are made of a single and continuous piece that includes a common material, wherein the beltline seal extends between the front and rear vertical supports, and wherein the front and rear beltline end pieces include surface profiles that are formed to have a shape that matches the respective exterior surfaces of the front and rear vertical supports, respectively, and wherein the surface profiles match the respective exterior surfaces when the front and rear beltline end pieces are engaged with the respective front and rear vertical supports and when the front and rear beltline end pieces are separated from the respective front and rear vertical supports.

8. The vehicle door sealing assembly of claim 7, wherein the front and rear beltline end pieces each include a flexible web member that extends from an upper lip of the beltline seal to a body of the beltline seal and an exterior surface of the front and rear vertical supports, respectively.

9. The vehicle door sealing assembly of claim 7, wherein the beltline seal and the front and rear beltline end pieces are formed of a single integral piece that extends between the front and rear vertical supports, and wherein engagement of the front and rear beltline end pieces with the front and rear vertical supports, respectively, defines a substantially airtight seal.

* * * * *